United States Patent
Luna Acevedo et al.

(10) Patent No.: US 12,537,421 B2
(45) Date of Patent: Jan. 27, 2026

(54) STATOR FOR ELECTRIC MACHINE

(71) Applicant: General Electric Deutschland Holding GmbH, Frankfurt (DE)

(72) Inventors: Israel Luna Acevedo, Munich (DE); Thanasekaran Gopal, Ingolstadt (DE); Rammohan Rao Kalluri, Garching (DE); Mohamed Osama, Garching (DE); Tamilselvan Srinivasan, Munich (DE)

( * ) Notice: Subject to any disclaimer, the term of this patent is extended or adjusted under 35 U.S.C. 154(b) by 0 days.

(21) Appl. No.: 18/594,330

(22) Filed: Mar. 4, 2024

(65) Prior Publication Data
US 2025/0279697 A1    Sep. 4, 2025

(51) Int. Cl.
| | | |
|---|---|---|
| H02K 9/19 | (2006.01) | |
| F01D 15/10 | (2006.01) | |
| H02K 7/18 | (2006.01) | |

(52) U.S. Cl.
CPC ............... *H02K 9/19* (2013.01); *F01D 15/10* (2013.01); *H02K 7/1823* (2013.01)

(58) Field of Classification Search
CPC ......... H02K 9/19; H02K 7/1823; F01D 15/10
See application file for complete search history.

(56) References Cited

U.S. PATENT DOCUMENTS

| | | | |
|---|---|---|---|
| 6,661,133 B2 | 12/2003 | Liebermann | |
| 6,762,520 B1 | 7/2004 | Ehrhart et al. | |
| 6,856,053 B2 | 2/2005 | LeFlem et al. | |
| 7,514,826 B2 | 4/2009 | Wakita | |
| 7,545,060 B2 | 6/2009 | Ward | |
| 8,552,600 B2 | 10/2013 | Bradfield | |
| 8,633,620 B2 | 1/2014 | Kimmich et al. | |
| 9,331,553 B2 | 5/2016 | Mayor et al. | |
| 9,559,569 B2 | 1/2017 | Huang et al. | |
| 9,729,020 B2 | 8/2017 | Pal | |
| 9,748,822 B2 | 8/2017 | Pal | |
| 9,768,666 B2 | 9/2017 | Buttner et al. | |
| 9,819,239 B2 | 11/2017 | Pal et al. | |

(Continued)

FOREIGN PATENT DOCUMENTS

| | | |
|---|---|---|
| CN | 108964317 A | 12/2018 |
| DE | 102020206333 A1 | 11/2021 |

(Continued)

OTHER PUBLICATIONS

Larocca et al., Enhanced Cooling for an Electric Starter-Generator for Aerospace Application, 7th IET International Conference on Power Electronics, Machines and Drives (PEMD 2014), 2014, 1-7. (Abstract Only) https://doi.org/10.1049/cp.2014.0373.

(Continued)

*Primary Examiner* — Joseph Ortega
(74) *Attorney, Agent, or Firm* — McCarter & English, LLP; Michael M. Gnibus

(57) ABSTRACT

A stator for an electric machine includes a stator core defining a slot extending in an axial direction from a first end to a second end, a wire disposed in the slot, a coolant pipe disposed in the slot and extending in the axial direction from the first end to the second end, the coolant pipe extending from a pipe inlet to a pipe outlet, and a thermally conductive potting material disposed in the slot between the coolant pipe, the wire, and the stator core.

19 Claims, 8 Drawing Sheets

(56) References Cited

U.S. PATENT DOCUMENTS

| | | |
|---|---|---|
| 10,008,907 B2 | 6/2018 | Hanumalagutti et al. |
| 10,938,279 B2 | 3/2021 | Stieger et al. |
| 10,958,145 B2 | 3/2021 | Gastaldi |
| 11,025,138 B2 | 6/2021 | Blum et al. |
| 11,171,545 B2 | 11/2021 | Coppola et al. |
| 11,683,919 B2 | 6/2023 | Bodla et al. |
| 11,719,122 B2 | 8/2023 | Pazinski et al. |
| 2004/0100154 A1 | 5/2004 | Rahman et al. |
| 2011/0309695 A1 | 12/2011 | Huard |
| 2014/0175802 A1 | 6/2014 | Taniyama et al. |
| 2015/0091398 A1 | 4/2015 | Bradfield |
| 2015/0372568 A1 | 12/2015 | Korner |
| 2020/0063606 A1* | 2/2020 | Miller .................. F02K 5/00 |
| 2021/0013757 A1* | 1/2021 | Petrov .................. H02K 3/24 |
| 2021/0039797 A1 | 2/2021 | Goraj et al. |
| 2022/0200367 A1 | 6/2022 | Sangha et al. |
| 2022/0231551 A1 | 7/2022 | Kupiszewski et al. |
| 2022/0251971 A1 | 8/2022 | Pazinski et al. |
| 2022/0416613 A1 | 12/2022 | Goykhman et al. |
| 2023/0015125 A1 | 1/2023 | Tang et al. |
| 2023/0143600 A1 | 5/2023 | Saviers et al. |
| 2023/0170748 A1 | 6/2023 | Popcock et al. |
| 2023/0179066 A1 | 6/2023 | Toliyat et al. |
| 2023/0387735 A1* | 11/2023 | Keum .................. H02K 15/12 |

FOREIGN PATENT DOCUMENTS

| | | |
|---|---|---|
| DE | 102020207913 A1 | 12/2021 |
| GB | 2574826 A | 12/2019 |
| GB | 2574827 A | 12/2019 |

OTHER PUBLICATIONS

Schiefer et al., Indirect Slot Cooling for High-Power-Density Machines with Concentrated Winding, 2015 IEEE International Electric Machines & Drives Conference (IEMDC), 2015, 1820-1825. (Abstract Only) ttps://doi.org/10.1109/IEMDC.2015.7409311.

* cited by examiner

STATOR FOR ELECTRIC MACHINE

FIELD

The present disclosure relates to gas turbine engines, and more specifically to cooling devices in gas turbine engines.

BACKGROUND

Typical aircraft propulsion systems include one or more gas turbine engines. For certain propulsion systems, the gas turbine engines generally include a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Incorporating an electrical machine (e.g., an electrical generator) into a propulsion engine to generate electrical power from mechanical energy generated by the propulsion engine may enhance the capabilities of aircraft. For example, the electrical power generated by the electrical machine may be used to operate an accessory propulsor (e.g., an electric fan, motor, or the like) to supplement thrust provided via the turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
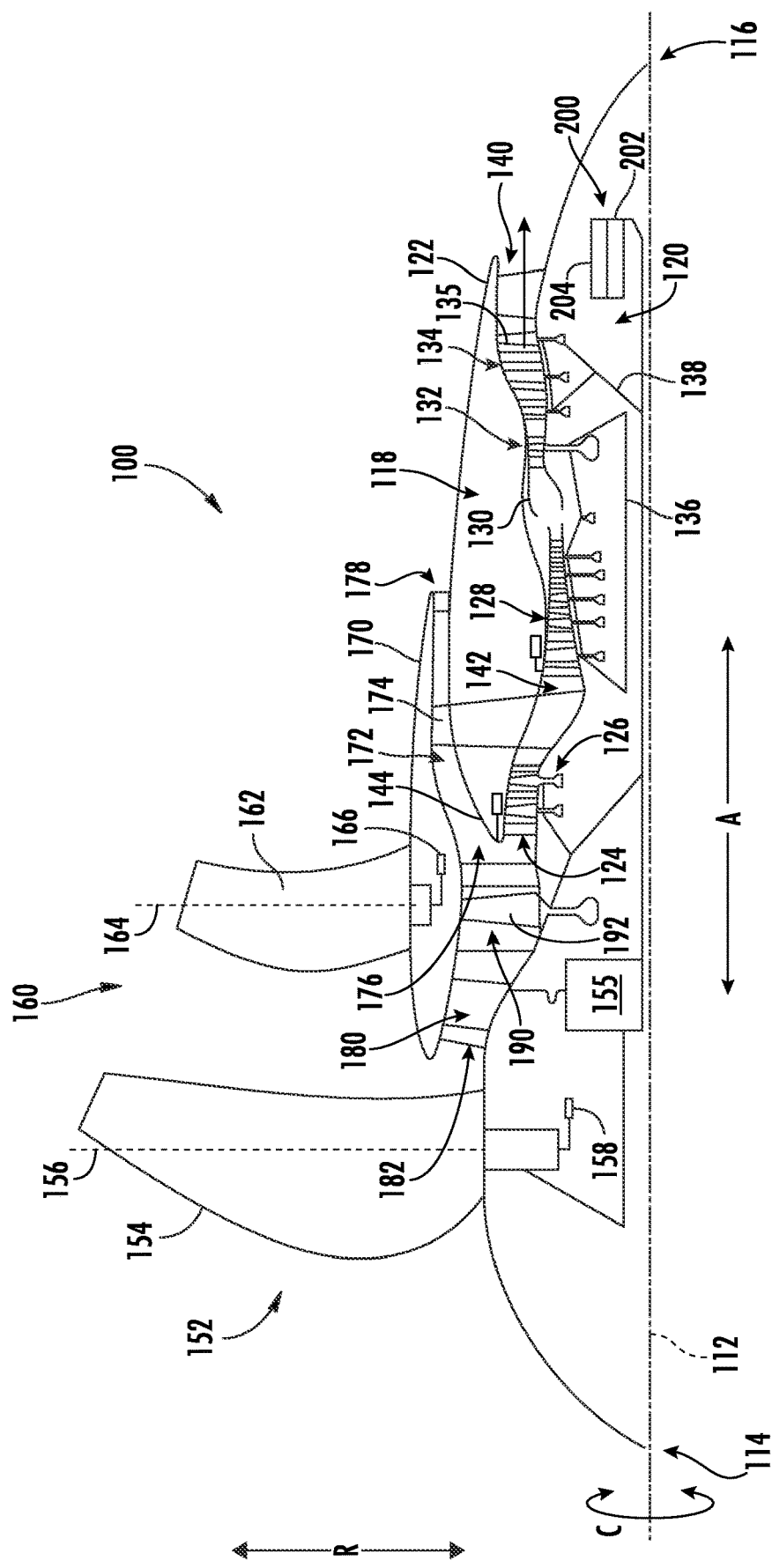
FIG. 1 is a cross-sectional view of an exemplary gas turbine engine.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The terms "upstream" and "downstream" refer to the relative direction with respect to fluid flow in a fluid pathway. For example, "upstream" refers to the direction from which fluid flows, and "downstream" refers to the direction to which the fluid flows.

The present disclosure is generally related to devices for cooling electric machines in gas turbine engines, as well as methods of forming such devices. During operation, electric machines (such as electric motors and electric generators) generate heat. The heat may interfere with operation of the electric machine, such as increasing an electrical resistance of wires that leads to a decreased magnetic field generated by the wires. Thermal management to dissipate generated heat leads to improved efficiency and lifespan of the electric machines.

Liquid coolants can provide heat transfer by convection, and solid thermal sinks can provide heat transfer by conduction. Providing a liquid coolant in pipes in the stator dissipates heat from the wires. Applying a potting material that has a high thermal conductivity to ends of the stator further dissipates heat from the wires. By combining the convective heat transfer of the coolant and the conductive heat transfer of the potting material, the overall heat dissipation from the wires increases, and the efficiency of the electric machine is improved.

Referring now to FIG. 1, a schematic cross-sectional view of a gas turbine engine according to one example embodiment of the present disclosure is shown. Particularly, FIG. 1 provides an aviation three-stream turbofan engine herein referred to as "three-stream engine 100". The three-stream engine 100 of FIG. 1 can be mounted to an aerial vehicle, such as a fixed-wing aircraft, and can produce thrust for propulsion of the aerial vehicle. The three-stream engine 100 is a "three-stream engine" in that its architecture provides three distinct streams of thrust-producing airflow during operation.

For reference, the three-stream engine 100 defines an axial direction A, a radial direction R, and a circumferential direction C. Moreover, the three-stream engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The three-stream engine 100 extends between a forward end 114 and an aft end 116, e.g., along the axial direction A.

The three-stream engine 100 includes a core engine 118 and a fan section 150 positioned upstream thereof. Generally, the core engine 118 includes, in serial flow order, a compressor section, a combustion section, a turbine section, and an exhaust section. Particularly, as shown in FIG. 1, the core engine 118 includes an engine core 120 and a core cowl 122 that annularly surrounds the engine core 120. The engine core 120 and core cowl 122 define an annular core inlet 124. The core cowl 122 further encloses and supports a booster or low pressure compressor 126 for pressurizing the air that enters the core engine 118 through core inlet 124. A high pressure, multi-stage, axial-flow compressor (hereinafter, a high pressure compressor 128) receives pressurized air from the LP compressor 126 and further increases the pressure of the air. The pressurized air stream flows downstream to a combustor 130 where fuel is injected into the pressurized air stream and ignited to raise the temperature and energy level of the pressurized air.

The high energy combustion products flow from the combustor 130 downstream to a high pressure turbine 132. The high pressure turbine 132 drives the high pressure compressor 128 through a first shaft or high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126, components of the fan section 150, and an electric machine 200 through a second shaft or low pressure shaft 138. Specifically, the high energy combustion products drive turbine blades 135 of the low pressure turbine 134. In this regard, the low pressure turbine 134 is drivingly coupled with the low pressure compressor 126, components of the fan section 150, and the electric machine 200. The LP shaft 138 is coaxial with the HP shaft 136 in this example embodiment. After driving each of the turbines 132, 134, the combustion products exit the core engine 118 through a core exhaust nozzle 140 to produce propulsive thrust. Accordingly, the core engine 118 defines a core flowpath or core duct 142 that extends between the core inlet 124 and the core exhaust nozzle 140. The core duct 142 is an annular duct positioned generally inward of the core cowl 122 along the radial direction R.

The fan section 150 includes a primary fan 152. For the depicted embodiment of FIG. 1, the primary fan 152 is an open rotor or unducted primary fan 152. However, in other embodiments, the primary fan 152 may be ducted, e.g., by a fan casing or nacelle circumferentially surrounding the primary fan 152. As depicted, the primary fan 152 includes an array of fan blades 154 (only one shown in FIG. 1). The fan blades 154 are rotatable, e.g., about the longitudinal axis 112. As noted above, the primary fan 152 is drivingly coupled with the low pressure turbine 134 via the LP shaft 138. The primary fan 152 can be directly coupled with the LP shaft 138, e.g., in a direct-drive configuration. Optionally, as shown in FIG. 1, the primary fan 152 can be coupled with the LP shaft 138 via a speed reduction gearbox 155, e.g., in an indirect-drive or geared-drive configuration.

Moreover, the fan blades 154 can be arranged in equal spacing around the longitudinal axis 112. Each of the fan blades 154 has a root and a tip and a span defined therebetween. Each of the fan blades 154 defines a central blade axis 156. For this embodiment, each of the fan blades 154 of the primary fan 152 is rotatable about their respective central blades axes 156, e.g., in unison with one another. One or more actuators 158 can be controlled to pitch the fan blades 154 about their respective central blades axes 156. However, in other embodiments, each of the fan blades 154 may be fixed or unable to be pitched about its central blade axis 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or may be shrouded, e.g., by an annular shroud spaced outward from the tips of the fan guide vanes 162 along the radial direction R. Each fan guide vane 162 defines a central blade axis 164. For this embodiment, each fan guide vane 162 of the fan guide vane array 160 is rotatable about their respective central blades axes 164, e.g., in unison with one another. One or more actuators 166 can be controlled to pitch the fan guide vane 162 about their respective central blades axes 164. However, in other embodiments, each fan guide vane 162 may be fixed or unable to be pitched about its central blade axis 164. The fan guide vanes 162 are mounted to a fan cowl 170.

The fan cowl 170 annularly encases at least a portion of the core cowl 122 and is generally positioned outward of the core cowl 122 along the radial direction R. Particularly, a downstream section of the fan cowl 170 extends over a forward portion of the core cowl 122 to define a fan flowpath or fan duct 172. Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced struts 174 (only one shown in FIG. 1). The struts 174 may each be aerodynamically contoured to direct air flowing thereby. Other struts in addition to struts 174 may be used to connect and support the fan cowl 170 and/or core cowl 122.

The three-stream engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the primary fan 152 and the fan guide vanes 162 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a nose of a splitter 144 of the core cowl 122. The inlet duct 180 is wider than the core duct 142 along the radial direction R. The inlet duct 180 is also wider than the fan duct 172 along the radial direction R.

As depicted, the fan section 150 also includes a mid-fan 190. The mid-fan 190 includes an array of mid-fan blades 192 (only one shown in FIG. 1). The mid-fan blades 192 are rotatable, e.g., about the longitudinal axis 112. The mid-fan 190 is drivingly coupled with the low pressure turbine 134 via the LP shaft 138. The mid-fan blades 192 can be arranged in equal circumferential spacing around the longitudinal axis 112. Each mid-fan blade 192 has a root 194 and a tip 196 and a span defined therebetween. Moreover, each mid-fan blade 192 has a leading edge 198 and a trailing edge 199. The mid-fan blades 192 are annularly surrounded or ducted by the fan cowl 170. In this regard, the mid-fan 190 is positioned inward of the fan cowl 170 along the radial direction R. Moreover, for this example embodiment, the mid-fan 190 is positioned within the inlet duct 180 upstream of both the core duct 142 and the fan duct 172.

Accordingly, air flowing through the inlet duct 180 flows across the mid-fan blades 192 and is accelerated downstream thereof, particularly at the tips 196 of the mid-fan blades 192. At least a portion of the air accelerated by the mid-fan blades 192 flows into the fan duct 172 and is ultimately exhausted through the fan exhaust nozzle 178 to produce propulsive thrust. Also, at least a portion of the air accelerated by the mid-fan blades 192 flows into the core duct 142 and is ultimately exhausted through the core exhaust nozzle 140 to produce propulsive thrust. Generally, the mid-fan 190 is a compression device positioned downstream of the engine inlet 182. The mid-fan 190 is operable to accelerate air into the fan duct 172 or secondary bypass passage.

It will be appreciated, however, that the three-stream engine 100 is provided by way of example only. In other exemplary embodiments, the three-stream engine 100 may have any other configuration. For example, in other exemplary embodiments, the engine core 120 may have any other number and arrangement of shafts, spools, compressors, turbines, etc. Further, in other exemplary embodiments, the three-stream engine 100 may alternatively be configured as a ducted turbofan engine (including an outer nacelle surrounding the primary fan 152 and a portion of the engine core 120); as a direct drive gas turbine engine (may not include a reduction gearbox, such as the speed reduction gearbox 155); as a fixed pitch gas turbine engine (may not include a variable pitch fan, such as the primary fan 152); as a two-stream gas turbine engine (may not include the fan duct 172); etc.

Further, for the depicted embodiment of FIG. 1, the three-stream engine 100 includes an electric machine operably coupled with a rotating component thereof. In this regard, the three-stream engine 100 is an aeronautical hybrid-electric propulsion machine. Particularly, as shown in FIG. 1, the three-stream engine 100 includes electric machine 200 operatively coupled with the LP shaft 138. The electric machine 200 includes a rotor 202 and a stator 204. The electric machine 200 can be directly mechanically connected to the LP shaft 138, or alternatively, the electric machine 200 can be mechanically coupled with the LP shaft 138 indirectly, e.g., by way of a gearbox. Further, although the electric machine 200 is operatively coupled with the LP shaft 138 at an aft end of the LP shaft 138, the electric machine 200 can be coupled with the LP shaft 138 at any suitable location or can be coupled to other rotating components of the three-stream engine 100, such as the HP shaft 136.

In some embodiments, the electric machine 200 can be an electric motor operable to drive or motor the LP shaft 138, e.g., during an engine burst. In other embodiments, the electric machine 200 can be an electric generator operable to convert mechanical energy into electrical energy. In this way, electrical power generated by the electric machine 200 can be directed to various engine and/or aircraft systems. In some embodiments, the electric machine 200 can be a motor/generator with dual functionality.

Figure 2:
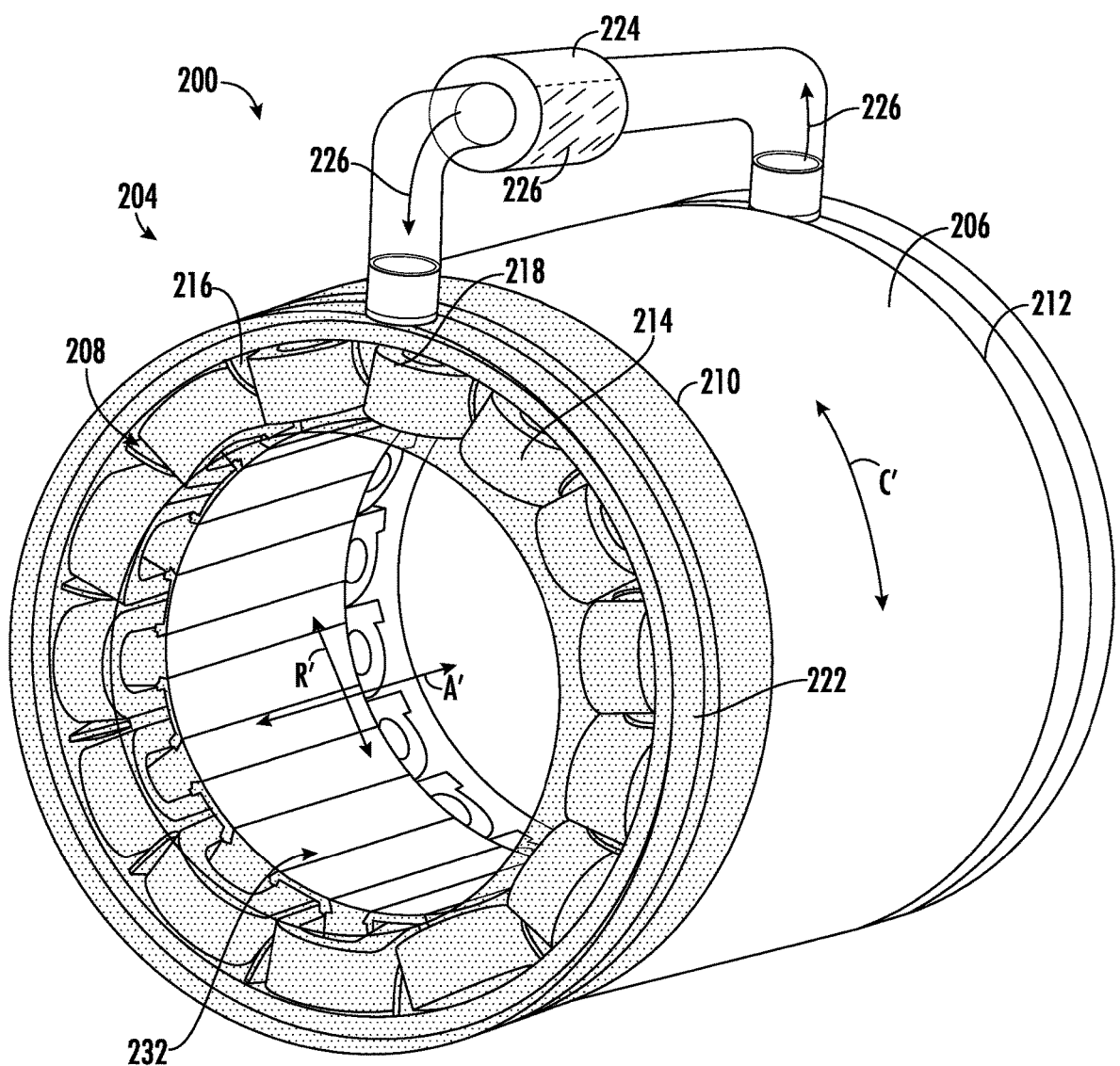
FIG. 2 is a perspective view of an exemplary stator of an electric machine of the exemplary gas turbine engine of FIG. 1.

Now referring to FIG. 2, an exemplary stator 204 for an electric machine 200 (specifically, an electric motor) is shown. The stator 204 defines an axial direction A', a radial direction R', and a circumferential direction C'. In certain exemplary embodiments, the exemplary stator 204 of FIG. 2 may be incorporated into the electric machine 200 of FIG. 1. In such an exemplary embodiment, it will be appreciated that the axes used for the directions A', R', and C' are defined relative to the electric machine 200 and may or may not align with the directions A, R, C for the three-stream engine 100.

The stator 204 includes a stator core 206 defining a plurality of slots 208 extending in the axial direction A' from a first end 210 of the stator core 206 to a second end 212 of the stator core 206. The stator 204 includes a plurality of wires 214 arranged as windings disposed in the slots 208 and a plurality of coolant pipes 216 disposed through the plurality of slots 208, the plurality of coolant pipes 216 extending in the axial direction A' from the first end 210 to the second end 212. Each of the plurality of coolant pipes 216 extends from a pipe inlet 218 to a pipe outlet 220 (best shown in FIGS. 4-4B). The stator core 206 includes a manifold 222 that extends around the stator core 206 in the circumferential direction C', and the manifold 222 fluidly connects to each of the plurality of coolant pipes 216. The stator 204 includes a coolant supply 224 that fluidly connects to the manifold 222 to supply a coolant 226 to the manifold 222 and to the coolant pipes 216. The stator 204 includes a thermally conductive potting material 228 disposed in the plurality of slots 208 between the plurality of coolant pipes 216, the plurality of wires 214, and the stator core 206.

The stator core 206 is the stationary part of the electric machine 200, providing structure to house the rotor 202 (not shown) that rotates within the stator 204. The stator core 206 and the plurality of wires 214 act as an electromagnet during operation of the electric machine 200. That is, when the rotor 202 is rotating within the stator 204, the rotor 202 induces electric current through the plurality of wires 214, generating electric current. In such a configuration, the electric machine 200 acts as a generator to generate electricity for use by other components.

Alternatively, by providing electric current to the plurality of wires 214, the stator 204 generates a magnetic field that rotates the rotor 202, providing rotational motion to a rotor shaft (not shown) to drive other components. In such a configuration, the electric machine 200 acts as a motor that drives rotation of another component.

During operation of the electric machine, electrical resistance in the plurality of wires 214 generates heat that may interfere with electric current generation. As will be explained in greater detail below, the plurality of coolant pipes 216 and the thermally conductive potting material 228 dissipate heat from the plurality of wires 214, improving performance of the electric machine 200.

As shown in FIG. 2, the stator 204 includes the thermally conductive potting material 228. The potting material 228 is disposed on the first end 210 of the stator core 206 and the second end 212 of the stator core 206, extending into the plurality of slots 208 between the plurality of coolant pipes 216, the plurality of wires 214, and the stator core 206, covering the first and second ends 210, 212 and the manifold 222. The potting material 228 absorbs heat from the plurality of coolant pipes 216 and the plurality of wires 214, increasing heat transfer out from the stator 204. The potting material 228 may include an electrically-insulative material, such as an epoxy resin, a silicon-based resin, or both. The potting material 228 is applied as a liquid or gel, and then the potting material 228 is cured to a solid in a heat treatment or drying process. The solid potting material 228, being in contact with the stator core 206 and the plurality of wires 214, fixes the plurality of wires 214 within the plurality of slots 208. The potting material 228 thus secures the plurality of wires 214 to the stator core 206, improving structural integrity and conductive heat transfer of the stator 204.

The stator core 206 includes a plurality of wedges 230, each wedge 230 enclosing the respective wire 214 and the respective coolant pipe 216 within the respective slot 208. The wedges 230 are angular-shaped components that are shaped to fixedly attach to the stator core 206, held in place in the slot 208 by friction. The plurality of wedges 230 and the stator core 206 form an inner surface 232 of the stator 204 in the radial direction R'. The plurality of wedges 230 may be substantially flush with the stator core 206 such that the inner surface 232 is substantially smooth.

Figure 3:
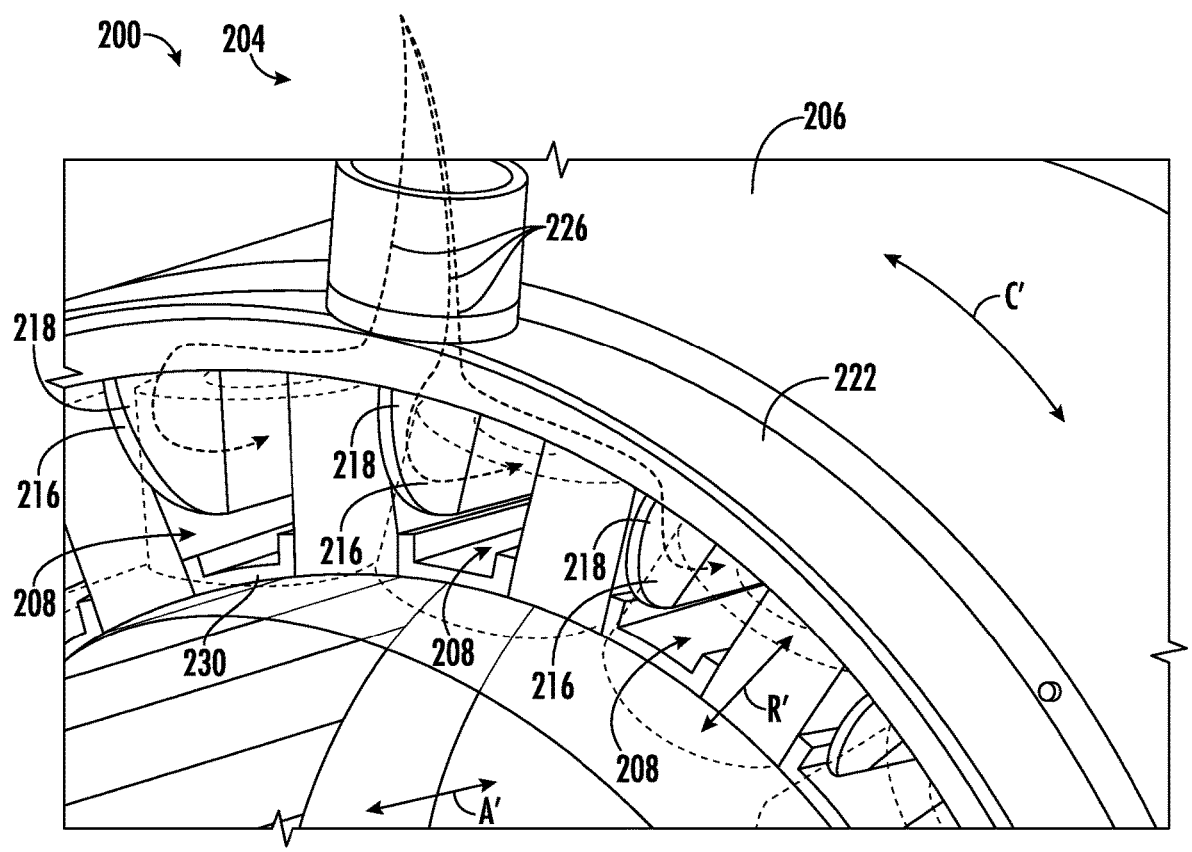
FIG. 3 is a partial magnified view of the stator of FIG. 2 illustrating coolant pipes.

Now referring to FIG. 3, a close-up view of the stator 204 of FIG. 2 is shown with the potting material 228 removed and the plurality of wires 214 shown in phantom lines to illustrate the arrangement of the coolant pipes 216 and the wires 214 within the slots 208. As described above, the plurality of coolant pipes 216 provide the coolant 226 to the plurality of wires 214, transferring the heat generated by the wires 214 away from the stator 204. Because the plurality of wires 214 extend from the first end 210 to the second end 212, heat is generated along the entire axial length of the slots 208. Accordingly, the plurality of coolant pipes 216 extend through the plurality of slots 208 from the first end 210 to the second end 212 to dissipate heat from the entire length of the plurality of wires 214. In order to dissipate the heat from the plurality of wires 214, at least one of the plurality of wires 214 transfers heat to the coolant pipe 216 via conduction, either by direct contact or with an intermediary heat transfer medium. The coolant 226 flowing through the coolant pipe 216 is heated by contact with the coolant pipe 216, and the heated coolant 226 flows out of the slot 208, dissipating heat out from the stator 204.

Figure 4:
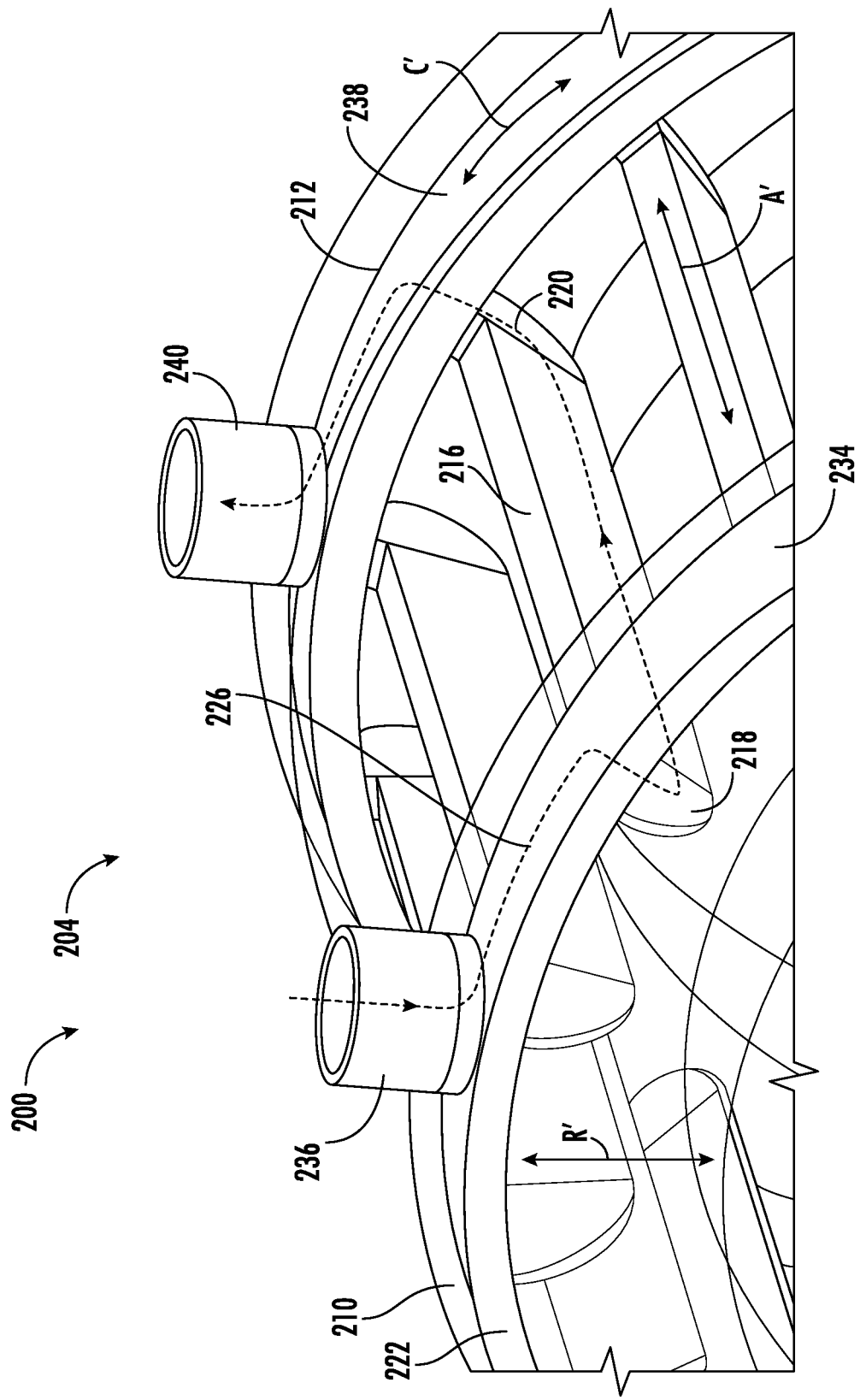
FIG. 4 is a partial magnified view of the stator of FIG. 2 illustrating coolant flow through the coolant pipes of FIG. 3.

Now referring to FIG. 4, the stator 204 of FIG. 3 is shown with the stator core 206 and the plurality of wires 214 removed to illustrate the manifold 222 and the coolant pipes 216. In the exemplary embodiment of FIG. 4, the pipe inlet 218 of each coolant pipe 216 is disposed at the first end 210 and the pipe outlet 220 of each coolant pipe 216 is disposed at the second end 212. The coolant pipes 216 are arranged in parallel to each other to allow the coolant 226 to flow through each of the coolant pipes 216 substantially simultaneously.

The manifold 222 extends around the stator core 206 in the circumferential direction C' outward of the stator core 206 in the radial direction R', fluidly connecting to each of the plurality of coolant pipes 216. The manifold 222 of FIG. 4 includes a first portion 234 including a manifold inlet 236 and a second portion 238 including a manifold outlet 240. The first portion 234 is disposed at the first end 210 and fluidly connects to the respective pipe inlet 218 of each of the coolant pipes 216. The second portion 238 of the manifold 222 is disposed at the second end 212 and fluidly connects to the respective pipe outlet 220 of each of the coolant pipes 216. In this configuration, each of the coolant pipes 216 extends from the first portion 234 of the manifold 222 to the second portion 238 of the manifold 222. The coolant supply 224 fluidly connects to the manifold inlet 236 and to the manifold outlet 240. The coolant 226 flows from the coolant supply 224 to the manifold inlet 236, into each pipe inlet 218, through each coolant pipe 216, out through each pipe outlet 220, to the manifold outlet 240, and back to the coolant supply 224.

Figure 5:
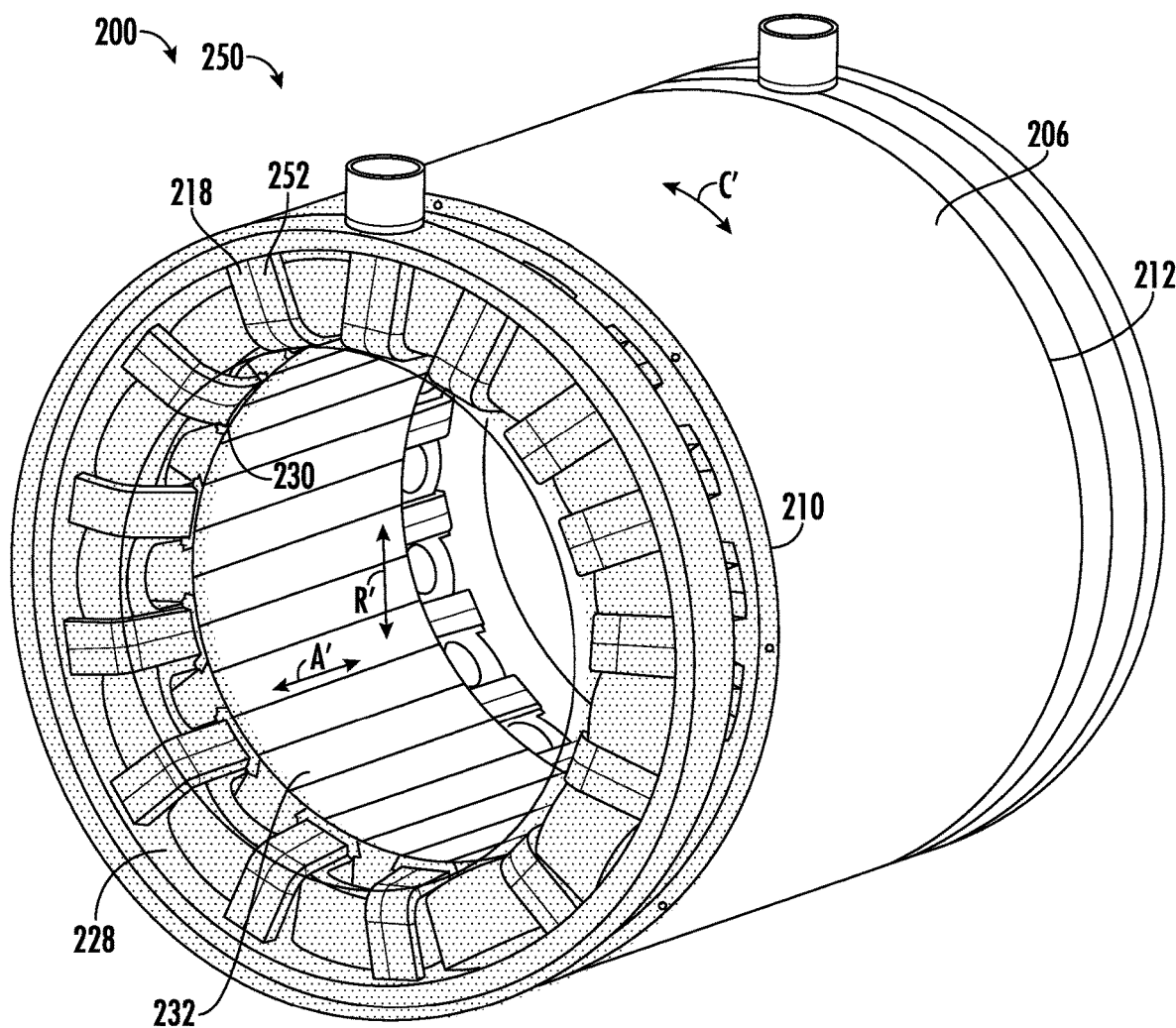
FIG. 5 is a perspective view of another exemplary stator.

Now referring to FIG. 5, another exemplary embodiment of the stator 250 is shown. The stator 250 of FIG. 5 may be configured in substantially the same manner as the exemplary stator of FIG. 2, and common structures will share a common numeral and a common function as described above. In this form, a plurality of coolant pipes 252 extend along the wedges 230 of the stator core 206 beneath the plurality of wires 214, i.e., inward in the radial direction R'. The arrangement of the coolant pipes 252 along the wedges 230 provides additional space within the slots 208 for the wires 214. The thermally conductive potting material 228 absorbs heat from the manifold 222 and the coolant pipes 252, further increasing heat transfer from the wires 214.

Figure 6:
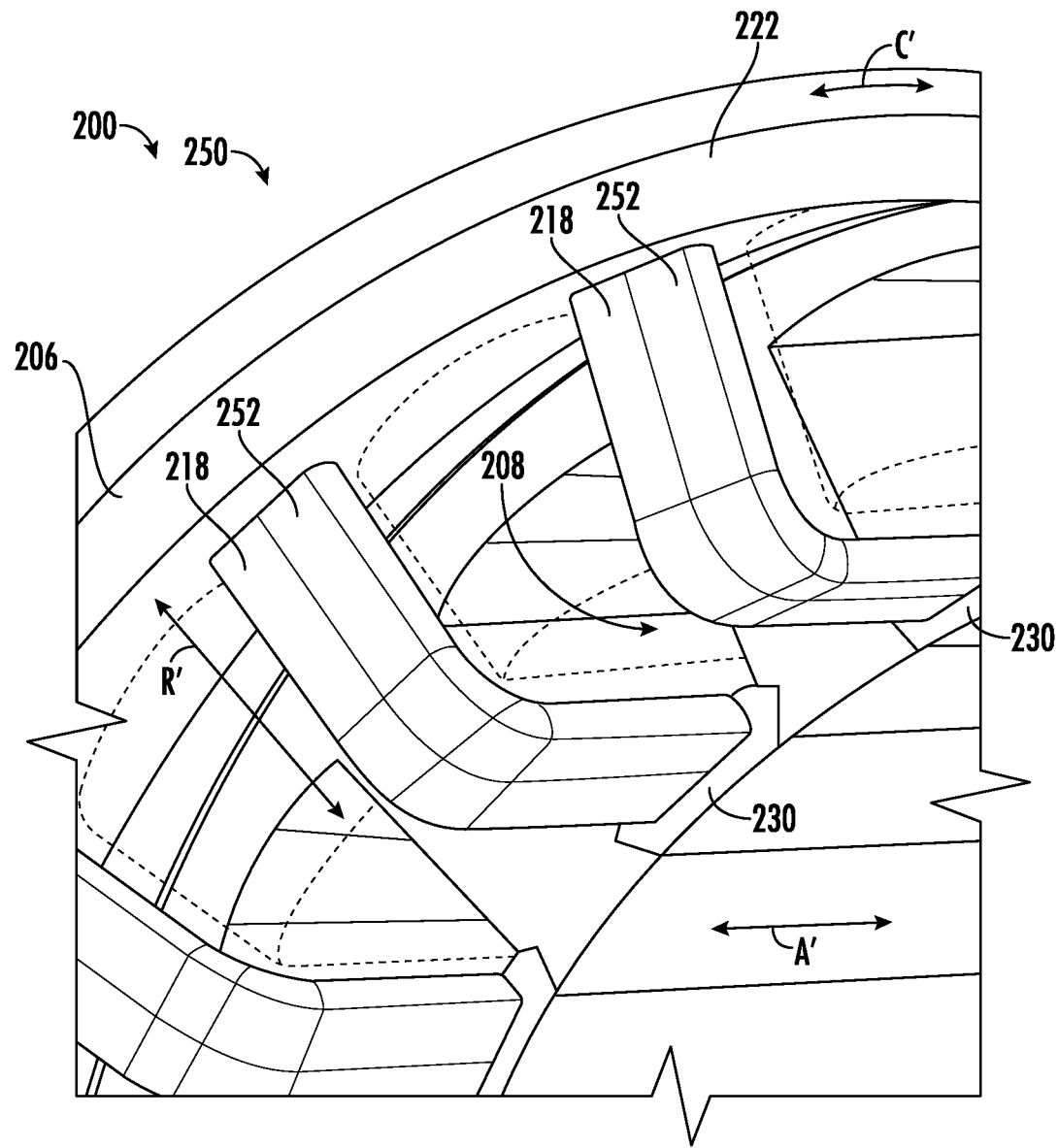
FIG. 6 is a partial magnified view of the stator of FIG. 5 illustrating coolant pipes.

With reference to FIG. 6, providing a partial schematic view of the stator 250 without the thermally conductive potting material 228, the coolant pipes 252 extend along the wedges 230 to contact the wires 214, cooling the wires 214 with the coolant 226 flowing therethrough. In the embodiment show, the wedges 230 form a surface onto which the coolant pipes 252 mate or contact. With this mating configuration, the wedges 230 may additionally transfer heat way from the coolant pipes 252, increasing the overall heat transfer from the wires 214. Additionally, the wedges 230 may support the coolant pipes 252 in the slots 208, holding the coolant pipes 252 against the wires 214 to increase contact therebetween, thereby increasing conductive heat transfer.

Figure 7:
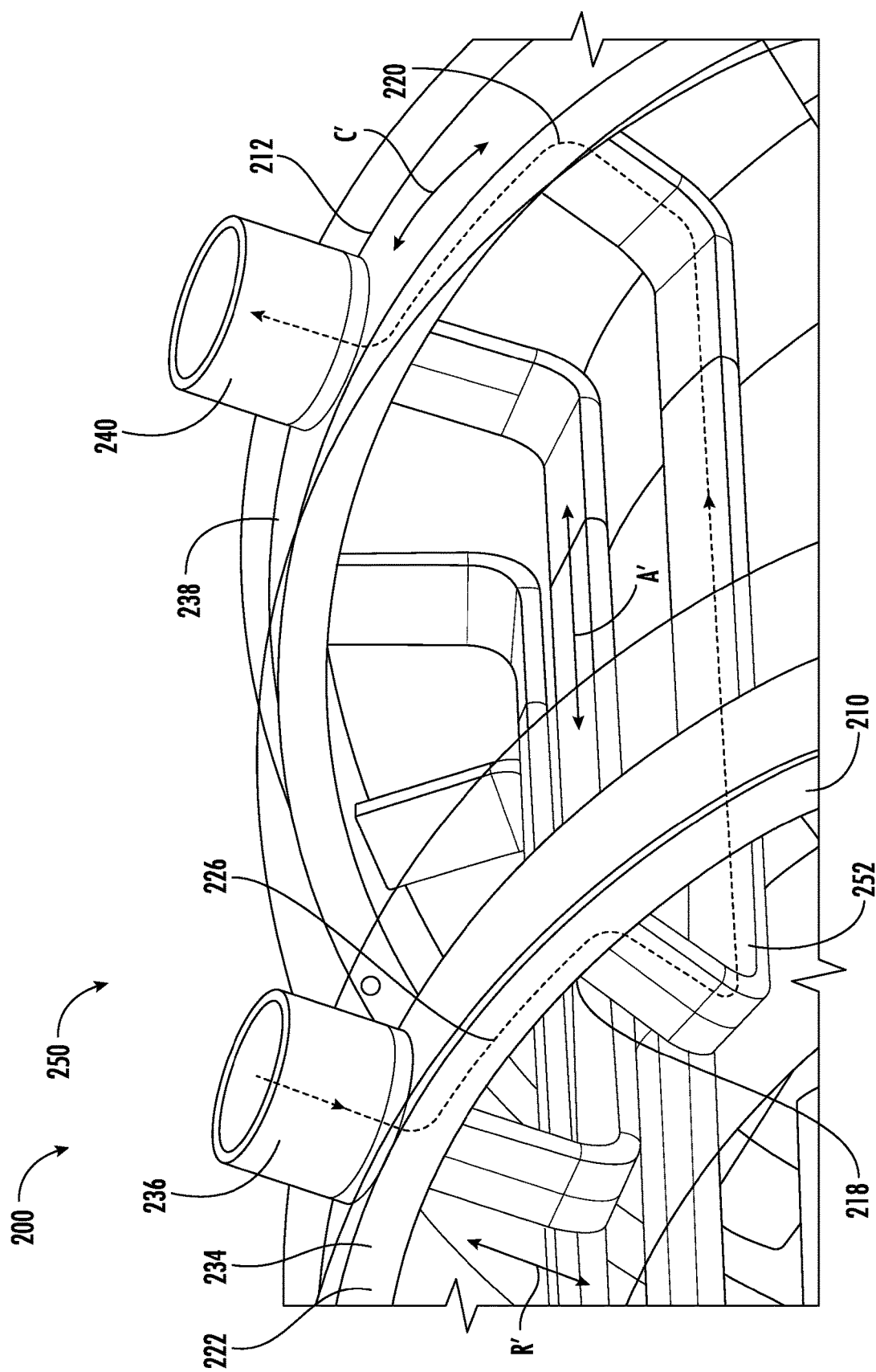
FIG. 7 is a partial magnified view of the stator of FIG. 2 illustrating coolant flow through the coolant pipes of FIG. 6.

Now referring to FIG. 7, providing partial schematic views of the stator 250 without the wires 214, the coolant pipes 252 flow the coolant 226 between the first and second portions 234, 238 of the manifold 222 in the axial direction A' to cool the wires 214. The coolant 226 flows through the coolant pipe 252 from the pipe inlet 218 at the first end 210 to the pipe outlet 220 at the second end 212, where the second portion 238 of the manifold 222 removes the coolant 226 to the coolant supply 224.

Figure 8:
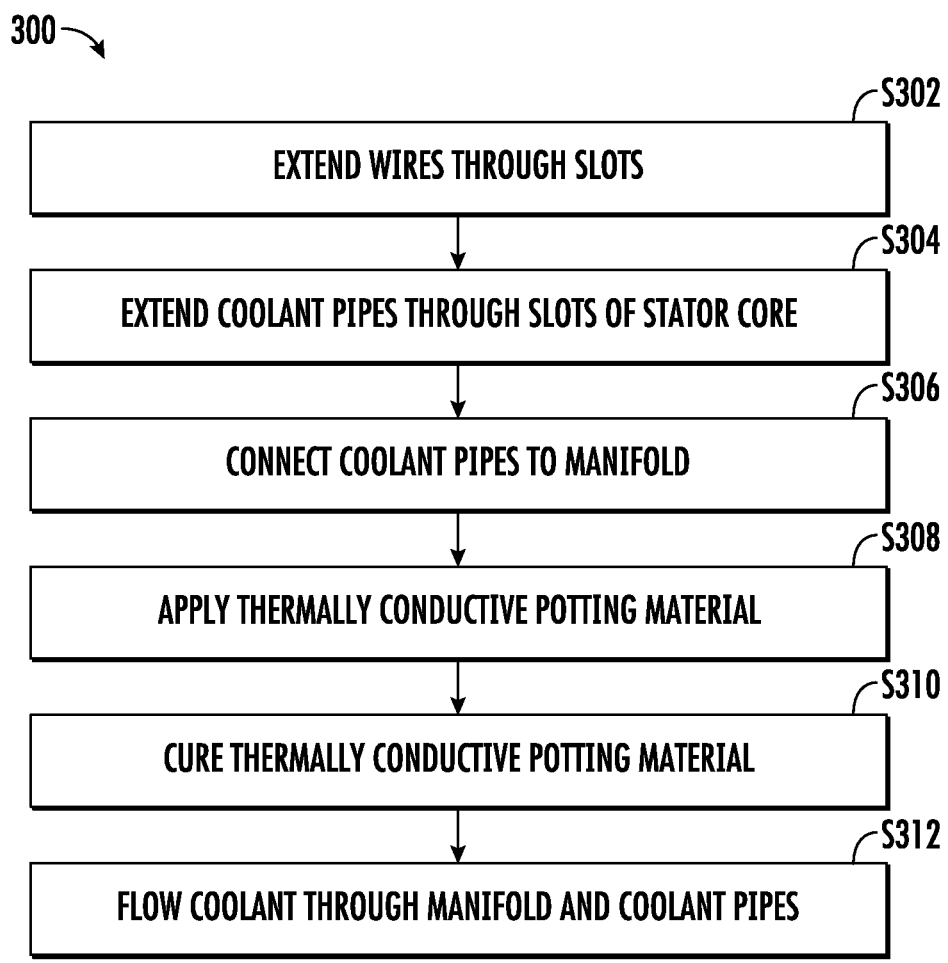
FIG. 8 is a block diagram of an exemplary method for forming an electric machine.

Referring now to FIG. 8, a flow diagram of a method 300 of forming a stator of an electric machine in accordance with an exemplary aspect of the present disclosure is provided. The method 300 of FIG. 8 may be utilized to build one or more of the exemplary electric machines described above with reference to FIGS. 1-7. Accordingly, it will be appreciated that the method 300 may generally be utilized to manufacture an electric machine for a gas turbine engine as described above. However, in other exemplary aspects, the method 300 may additionally or alternatively be utilized to manufacture any other electric machine.

As is depicted, the method 300 includes at (302) extending a plurality of wires through the plurality of slots along the plurality of coolant pipes. The plurality of wires extend from the first end of the stator core to the second end of the stator core.

The method includes at (304) extending a plurality of coolant pipes through a plurality of slots of a stator core. The coolant pipes extend in the axial direction from a first end of the stator core to a second end of the stator core. The coolant pipes may each have a pipe inlet at the first end and a pipe outlet at the second end. The coolant pipes may be disposed between adjacent windings of the plurality or wires, or the coolant pipes may be disposed beneath the plurality of wires.

The method includes at (306) placing a manifold around the stator core in the circumferential direction and connecting the coolant pipes to the manifold. The manifold provides coolant from a coolant supply to respective pipe inlets of each of the plurality of coolant pipes. A first portion of the manifold is placed at the first and, and a second portion of the manifold is placed at the second end.

The method includes at (308) applying a thermally conductive potting material to the first and second ends of the stator core, the plurality of wires, the plurality of coolant tubes, and the manifold. The thermally conductive potting material is applied as a liquid or a gel to cover the surfaces of the stator core and the manifold.

The method includes at (310) curing the thermally conductive potting material into a solid. Upon curing into a solid, the thermally conductive potting material secures the plurality of wires and the plurality of coolant pipes in the plurality of slots. The solid thermally conductive potting material transfers heat away from the coolant pipes and the plurality of wires, improving cooling of the stator.

The method includes at (312) flowing coolant through the manifold and the coolant pipes. The manifold is connected to a coolant supply that provides coolant to the coolant pipes. The coolant flows from the pipe inlet of each of the coolant pipes to the pipe outlet of each of the plurality of coolant pipes, transferring heat away from the plurality of wires.

Further aspects are provided by the subject matter of the following clauses:

A stator for an electric machine, the stator defining an axial direction, a circumferential direction, and a radial direction, the stator including a stator core defining a slot extending in the axial direction from a first end to a second end, a wire disposed in the slot, a coolant pipe disposed in the slot and extending in the axial direction from the first end to the second end, the coolant pipe extending from a pipe inlet to a pipe outlet, and a thermally conductive potting material disposed in the slot between the coolant pipe, the wire, and the stator core.

The stator of any of the previous clauses, wherein the wire is supported in the slot by the thermally conductive potting material.

The stator of any of the previous clauses, wherein the pipe inlet of the coolant pipe is disposed at the first end of the stator core, and wherein the pipe outlet of the coolant pipe is disposed at the second end of the stator core.

The stator of any of the previous clauses, wherein the thermally conductive potting material secures the wire to the stator core.

The stator of any of the previous clauses, wherein the thermally conductive potting material is an epoxy resin, a silicon-based resin, or both.

The stator of any of the previous clauses, wherein the coolant pipe contacts the wire.

The stator of any of the previous clauses, further including a coolant disposed in the coolant pipe, the coolant configured to dissipate heat from the wire upon flowing through the coolant pipe.

The stator of any of the previous clauses, further including a manifold extending around the stator core in the circumferential direction, the manifold fluidly connected to the coolant pipe.

The stator of any of the previous clauses, wherein the manifold is connected to the pipe inlet of the coolant pipe and connected to the pipe outlet of the coolant pipe.

The stator of any of the previous clauses, wherein the thermally conductive potting material is disposed on the manifold.

The stator of any of the previous clauses, further including a plurality of coolant pipes including the coolant pipe, wherein at least some of the plurality of coolant pipes are arranged in parallel to each other of the at least some of the plurality of coolant pipes.

The stator of any of the previous clauses, further comprising a coolant supply fluidly connected to the coolant pipe.

The stator of any of the previous clauses, wherein the stator core defines a plurality of slots.

The stator of any of the previous clauses, further comprising a plurality of wires.

A method of forming a stator of an electric machine, the stator defining an axial direction and a circumferential direction, the method including extending a plurality of wires in each of a plurality of slots of a stator core, extending, in each of the plurality of slots, at least one of a plurality of coolant pipes in the axial direction, and applying a thermally conductive potting material to an end of the stator core over the plurality of wires and the plurality of coolant pipes.

The method of any of the previous clauses, wherein the thermally conductive potting material is an epoxy resin, a silicon-based resin, or both.

The method of any of the previous clauses, further including curing the thermally conductive potting material to secure the plurality of wires to the stator core.

The method of any of the previous clauses, further including flowing a coolant through the plurality of coolant pipes to dissipate heat from the plurality of wires.

The method of any of the previous clauses, further including extending the at least one of the plurality of coolant pipes along a wedge of the stator core.

The method of any of the previous clauses, further including placing a manifold around the stator core in the circumferential direction, the manifold in fluid communication with the plurality of coolant pipes, and, then, applying the thermally conductive potting material to the end of the stator core and over the manifold.

The method of any of the previous clauses, wherein each of the plurality of coolant pipes extends from a pipe inlet connected to the manifold to a pipe outlet connected to the manifold.

An aeronautical gas turbine engine includes a turbomachine including a compressor, a combustor, and a turbine arranged in serial flow order and an electric machine defining an axial direction, the electric machine including a stator and a rotor, the rotor rotatable with the turbomachine, the stator including a stator core defining a plurality of slots extending in the axial direction from a first end to a second end, a plurality of wires disposed in the plurality of slots, a plurality of coolant pipes disposed through the plurality of slots and extending in the axial direction from the first end to the second end, each of the plurality of coolant pipes extending from a pipe inlet to a pipe outlet, and a thermally conductive potting material disposed in the plurality of slots between the plurality of coolant pipes, the plurality of wires, and the stator core.

The aeronautical gas turbine engine of any of the previous clauses, wherein the plurality of wires are supported in the slot by the thermally conductive potting material.

The aeronautical gas turbine engine of any of the previous clauses, wherein the pipe inlet of at least one of the plurality of coolant pipes is disposed at the first end of the stator core, and wherein the pipe outlet of at least one of the plurality of coolant pipes is disposed at the second end of the stator core.

The aeronautical gas turbine engine of any of the previous clauses, wherein the thermally conductive potting material secures the plurality of wires to the stator core.

The aeronautical gas turbine engine of any of the previous clauses, wherein the thermally conductive potting material is an epoxy resin, a silicon-based resin, or both.

The aeronautical gas turbine engine of any of the previous clauses, wherein at least one of the plurality of coolant pipes contacts at least one of the plurality of wires.

The aeronautical gas turbine engine of any of the previous clauses, further including a coolant disposed in the plurality of coolant pipes, the coolant configured to dissipate heat from the plurality of wires upon flowing through the plurality of coolant pipes.

The aeronautical gas turbine engine of any of the previous clauses, further including a manifold extending around the stator core in the circumferential direction, the manifold fluidly connected to the plurality of coolant pipes.

The aeronautical gas turbine engine of any of the previous clauses, wherein the manifold is connected to the pipe inlet of at least one of the plurality of coolant pipes and connected to the pipe outlet of at least one of the plurality of coolant pipes.

The aeronautical gas turbine engine of any of the previous clauses, wherein the thermally conductive potting material is disposed on the manifold.

The aeronautical gas turbine engine of any of the previous clauses, wherein at least some of the plurality of coolant pipes are arranged in parallel to each other of the at least some of the plurality of coolant pipes.

The aeronautical gas turbine engine of any of the previous clauses, further comprising a coolant supply fluidly connected to at least one of the plurality of coolant pipes.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A stator for an electric machine, the stator defining an axial direction, a circumferential direction, and a radial direction, the stator comprising:
   a stator core defining a slot extending in the axial direction from a first end to a second end;
   a wire disposed in the slot;
   a coolant pipe disposed in the slot and extending in the axial direction from the first end to the second end, the coolant pipe extending from a pipe inlet located at the first end to a pipe outlet located at the second end;
   a manifold located proximate at least one of the first or second ends, the manifold extending circumferentially around the associated stator end, the manifold fluidly connected to the coolant pipe; and
   a thermally conductive potting material disposed in the slot between the coolant pipe, the wire, the manifold, and the stator core.

2. The stator of claim 1, wherein the wire is supported in the slot by the thermally conductive potting material.

3. The stator of claim 1, wherein the pipe inlet of the coolant pipe is disposed at the first end of the stator core, and wherein the pipe outlet of the coolant pipe is disposed at the second end of the stator core.

4. The stator of claim 1, wherein the thermally conductive potting material secures the wire to the stator core.

5. The stator of claim 1, wherein the thermally conductive potting material is an epoxy resin, a silicon-based resin, or both.

6. The stator of claim 1, wherein the coolant pipe contacts the wire.

7. The stator of claim 1, further comprising a coolant disposed in the coolant pipe, the coolant configured to dissipate heat from the wire upon flowing through the coolant pipe.

8. The stator of claim 1, wherein the coolant pipe comprises an inlet and an outlet, and wherein the manifold comprises:
   a first manifold portion located at the first stator end; and
   a second manifold portion at the second stator end, wherein
   the connector pipe inlet is fluidly connected to the first manifold and the connector pipe outlet is fluidly connected to the second manifold.

9. The stator of claim 1, wherein the coolant pipe has an inlet and an outlet, and wherein the manifold is fluidly connected to the pipe inlet of the coolant pipe and connected to the pipe outlet of the coolant pipe.

10. The stator of claim 1, wherein the manifold is configured to receive a supply of a coolant fluid and enable the flow of the coolant circumferentially to the coolant pipe.

11. The stator of claim 1, further comprising a plurality of coolant pipes including the coolant pipe, wherein at least some of the plurality of coolant pipes are arranged in parallel to each other of the at least some of the plurality of coolant pipes.

12. The stator of claim 1, further comprising a coolant supply fluidly connected to the coolant pipe.

13. A method of forming a stator of an electric machine, the stator defining an axial direction and a circumferential direction, the method comprising:
   extending a plurality of wires in at least one of a plurality of slots of a stator core;
   extending, in at least one of the plurality of slots, at least one of a plurality of coolant pipes in the axial direction from a pipe inlet located at a first end of the stator core to a pipe outlet located at a second end of the stator core;
   placing a manifold at the first end or the second end of the stator core and around the stator core in the circumferential direction, the manifold in fluid communication with the plurality of coolant pipes; and
   applying a thermally conductive potting material to an end of the stator core over the plurality of wires, the plurality of coolant pipes, and the manifold.

14. The method of claim 13, wherein the thermally conductive potting material is an epoxy resin, a silicon-based resin, or both.

15. The method of claim 13, further comprising curing the thermally conductive potting material to secure the plurality of wires to the stator core.

16. The method of claim 13, further comprising flowing a coolant through the plurality of coolant pipes to dissipate heat from the plurality of wires.

17. The method of claim 13, further comprising extending the at least one of the plurality of coolant pipes along a wedge of the stator core.

18. The method of claim 13, wherein:
   the manifold comprises
      a first manifold portion located at the first end of the stator core;
      a second manifold portion located at the second end of the stator core; and
   at least one of the plurality of coolant pipes extends from a pipe inlet connected to one of the first or second manifold portions the manifold to a pipe outlet connected to the other of the first and second manifold portions.

19. An aeronautical gas turbine engine comprising:
   a turbomachine comprising a compressor, a combustor, and a turbine arranged in serial flow order; and
   an electric machine defining an axial direction, the electric machine comprising a stator and a rotor, the rotor rotatable with the turbomachine, the stator comprising:
      a stator core defining a plurality of slots extending in the axial direction from a first end to a second end;
      a plurality of wires disposed in the plurality of slots;

a plurality of coolant pipes disposed in the plurality of slots and extending in the axial direction from the first end to the second end, at least one of the plurality of coolant pipes extending from a pipe inlet located at the first end to a pipe outlet located at the second end;

a manifold located proximate at least one of the first or second ends, the manifold extending circumferentially around the associated stator end, the manifold fluidly connected to the coolant pipe; and a thermally conductive potting material disposed in the plurality of slots between the plurality of coolant pipes, the plurality of wires, the manifold and the stator core.

* * * * *